(No Model.) 2 Sheets—Sheet 1.
J. A. MEALER.
HAY PRESS.
No. 484,504. Patented Oct. 18, 1892.
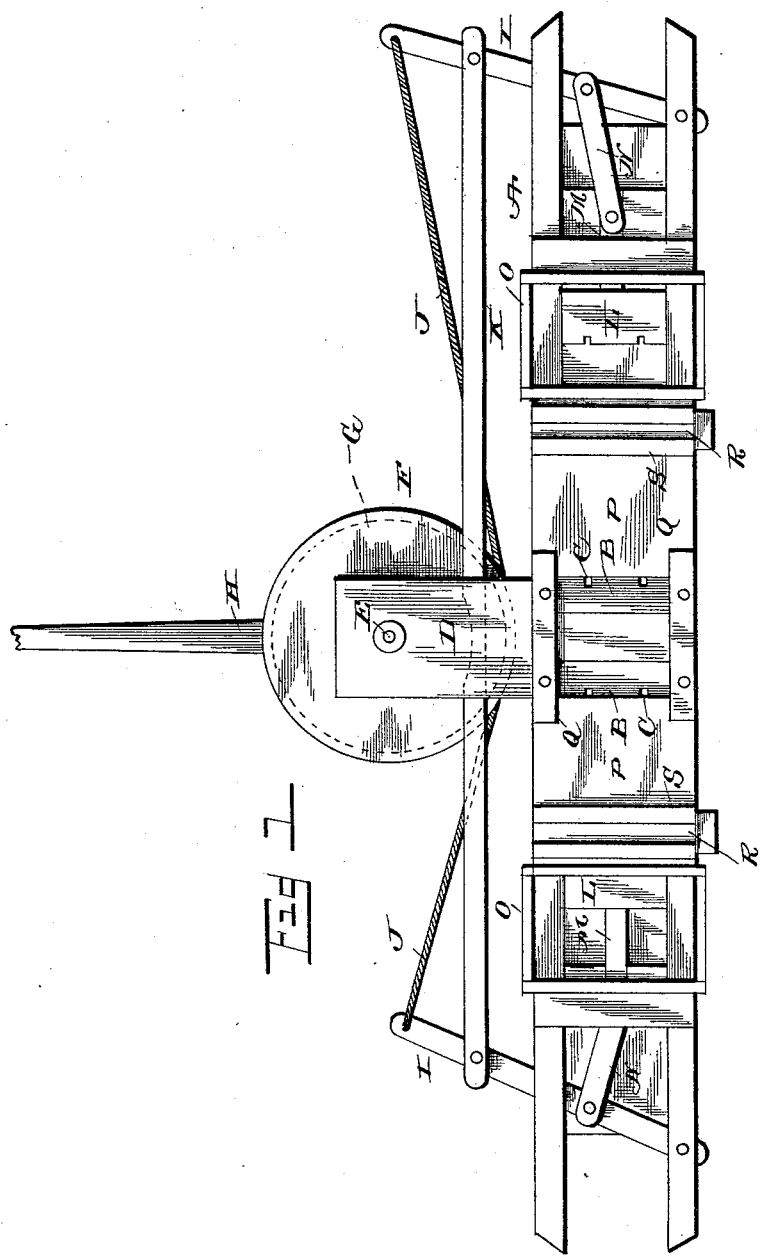
Witnesses
Inventor
James A. Mealer
By his Attorney
R. W. Bishop.

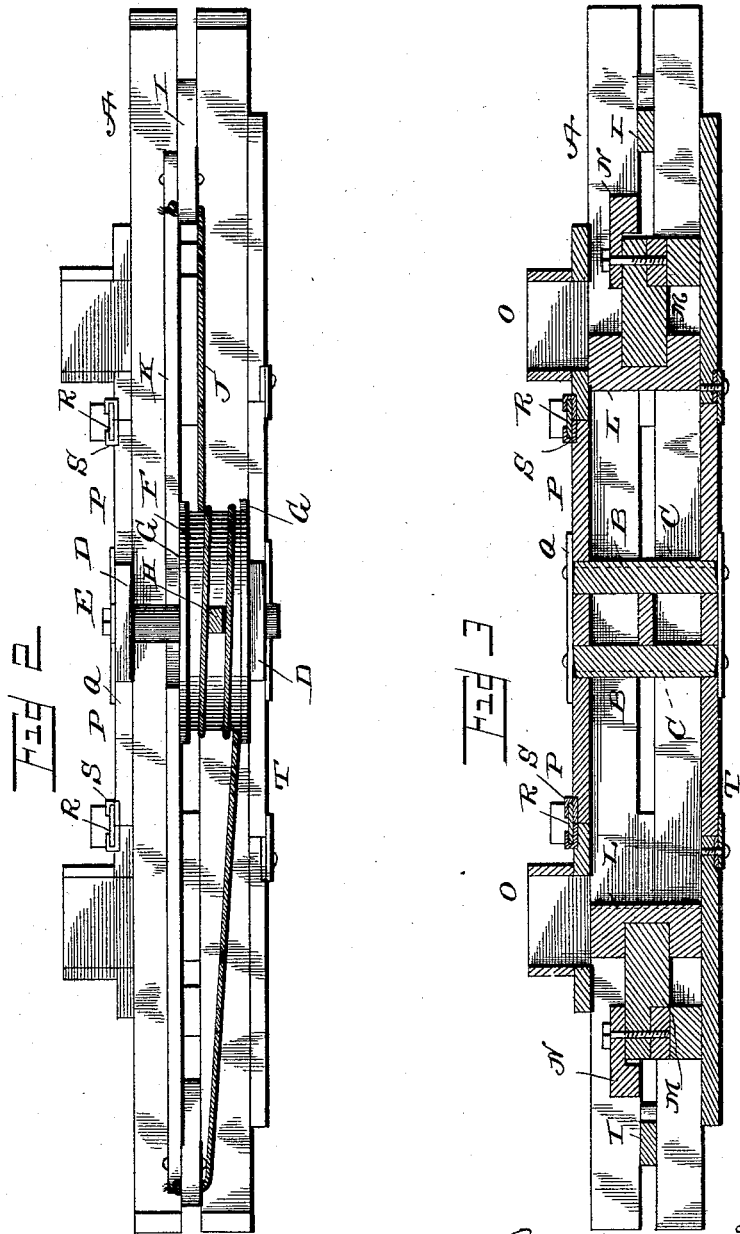

UNITED STATES PATENT OFFICE.

JAMES A. MEALER, OF LAMPASAS, TEXAS.

HAY-PRESS.

SPECIFICATION forming part of Letters Patent No. 484,504, dated October 18, 1892.

Application filed March 8, 1892. Serial No. 424,189. (No model.)

*To all whom it may concern:*

Be it known that I, JAMES A. MEALER, a citizen of the United States, residing at Lampasas, in the county of Lampasas and State of Texas, have invented certain new and useful Improvements in Hay-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in baling-presses, and seeks to provide a press especially adapted for baling hay which will be easily operated and by the use of which the bales will be rapidly and firmly compressed.

The invention consists in certain novel features of the device shown in the accompanying drawings, as will be hereinafter fully described and claimed.

In the annexed drawings, Figure 1 is a plan view of my improved press. Fig. 2 is a front elevation of the same with the supporting-frame removed, and Fig. 3 is a longitudinal vertical section of the same.

The frame A of the press may be of any desired size, and at the center of the same I secure the resistance-blocks B, which are provided with vertical grooves C in their outer faces, as clearly shown. The frame is also provided at its center with the lateral arms D, projecting horizontally from its top and bottom and having a king-pin E secured in their outer ends. The driving-wheel F is mounted on the said king-pin and is provided with the annular flanges G, which prevent the operating-cord, hereinafter referred to, from slipping from the wheel. The sweep H is secured rigidly to and projects radially from the driving-wheel, and suitable power is applied to the end of the sweep to vibrate the driving-wheel and thereby operate the press. It will be understood, of course, that any form of power may be employed to operate the press; but horse-power will generally be found the most convenient.

In the outer ends of the frame of the press I pivot the levers I, which extend laterally across the end of the frame and project beyond the side thereof. To the outer ends of the said levers I secure the ends of the operating cord or cable J, the central portion of which is wrapped tightly around the periphery of the driving-wheel F, so that when the said wheel is vibrated the operating cord or belt will be caused to draw on one of said levers and swing the same toward the center of the press. In order to secure a simultaneous action of the levers, so that one of them will be swung outward when the other is swung inward, I connect the said levers by a link K, which has its ends pivoted to the levers. The plungers L move between the bottom and top of the frame of the press and are provided with the outwardly-projecting guide-arms M, which bear on the bottom of the frame and against the side of the same, and thereby cause the plungers to move in perfectly-straight lines. The outer ends of the guide-arms are connected with the levers by the pitmen N, as clearly shown. A hopper O is arranged on the upper side of the press near each end thereof, and between each hopper and the center of the press I arrange a sliding plate or cover P, which extends over to the resistance-block. The said sliding plate is held in place by having one edge engaged under the ends of the plates Q, which are secured on the upper side of the press at the center of the same and by means of the latches R, which slide in the cleats or keepers S, secured on the covers and the frame of the press. On the bottom of the press I provide the plates T, which are held in position in a manner similar to that in which the plates P are held and are adapted to be removed to permit the discharge of the bale.

In practice my press will be mounted on a truck or other suitable supporting-frame; but for convenience of illustration I have omitted the supporting-frame from the drawings.

The operation of my press will be readily understood. The operator feeds the hay alternately into the hoppers and the sweep is continuously vibrated or swung from side to side. The operating-levers will thus be simultaneously vibrated in opposite directions, so that one plunger will be forced inward to act on the charge of hay at the same time that the other plunger is withdrawn. It will thus be seen that by the use of my press two bales are formed at one continuous operation. After the bales have been formed the covers and the bottom plates T are withdrawn to permit the binding-wire or bale-ties to be passed around the bale through the groove in the resistance-block and the follower, after which the bale is discharged through the bottom of the press. It will be understood that only one bale is bound at a time, as otherwise the hay would drop through the bottom of the press before it had been bound. The bale is held while being bound by forcing the plunger in against the same, thus compressing it between the plunger and the resistance-block and securing the levers against reverse movement.

From the foregoing description, taken in connection with the accompanying drawings, it will be seen that I have provided a very simple and efficient press, which may be easily operated and by the use of which two bales will be simultaneously formed very rapidly. It is deemed unnecessary to enlarge further upon the advantages of the device.

Having thus described my invention, what I claim, and desire to secure by Letters Patent, is—

1. In a hay-press, the combination of the frame provided with a central resistance-block and with hoppers or feed-openings on both sides of the said resistance-block, plungers mounted in the frame and acting against the resistance-block, levers mounted in the ends of the frame, connections between said levers and the plungers, and means for simultaneously operating said levers.

2. The combination, with the frame having the central resistance-block, of plungers mounted in the frame and acting against the resistance-block, levers mounted in the ends of the frame, connections between the said levers and the plungers, a driving-wheel arranged at one side of the frame, a belt passed around said wheel and secured to the levers, and a link connecting the levers.

3. The combination, with the frame, of the plungers mounted therein and provided with the outwardly-extending guide-arms bearing against the bottom and sides of the frame and means for reciprocating the plungers.

4. The combination, with the frame having the plates Q, of the cover adapted to be engaged under said plates, parallel cleats on the frame and the cover, and a latch sliding in said cleats.

In testimony whereof I affix my signature in presence of two witnesses.

JAMES A. MEALER.

Witnesses:
W. F. GILBERT,
W. C. BARKLY.